United States Patent
Roberts et al.

(10) Patent No.: US 7,758,750 B2
(45) Date of Patent: Jul. 20, 2010

(54) FLUME FOR A FILTER SYSTEM INCLUDING AT LEAST ONE FILTER HAVING A FILTER BED THAT IS PERIODICALLY WASHED WITH LIQUID, GAS OR A COMBINATION THEREOF

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 661 days.

(21) Appl. No.: 11/207,193

(22) Filed: Aug. 19, 2005

(65) Prior Publication Data
US 2007/0039867 A1 Feb. 22, 2007

(51) Int. Cl.
*B01D 24/46* (2006.01)

(52) U.S. Cl. .......... 210/274; 210/275; 210/291

(58) Field of Classification Search .......... 210/274, 210/275, 279, 291, 794, 795
See application file for complete search history.

(56) References Cited

U.S. PATENT DOCUMENTS 5,248,415 A * 9/1993 Masuda et al. .......... 210/154
6,306,310 B1 10/2001 Bergman et al.
6,312,611 B1 11/2001 Bergman et al.

OTHER PUBLICATIONS

Van Nostrand's Scientific Encyclopedia, Eight Edition, pp. 2311-2312, 1995.

* cited by examiner

*Primary Examiner*—Matthew O Savage
(74) *Attorney, Agent, or Firm*—Merek, Blackmon & Voorhees, LLC

(57) ABSTRACT

A flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. Preferably, the flumes includes at least a first inner wall and a second inner wall. Each of the first inner wall and the second inner wall are preferably free of any orifices. The first inner wall is positioned relative to the second inner wall such that an open space is formed between the first inner wall and the second inner wall. The open space creates a first liquid/gas interface upstream of the first inner wall and the second inner wall and a second gas/liquid interface downstream of the first inner wall and the second inner wall when gas and liquid are present in the chamber. The first interface is spaced from the bottom wall of the chamber a distance greater than the second interface.

16 Claims, 7 Drawing Sheets

FLUME FOR A FILTER SYSTEM INCLUDING AT LEAST ONE FILTER HAVING A FILTER BED THAT IS PERIODICALLY WASHED WITH LIQUID, GAS OR A COMBINATION THEREOF

FIELD OF THE INVENTION

The present invention is directed to a filter system having one or more filter beds that are periodically washed with a liquid, a gas and/or a combination of a liquid and a gas. Where a combination of a liquid and gas is used to wash the filter beds, the liquid and gas can be directed through the filter bed simultaneously or separately. More specifically, the present invention is directed to an improved flume used in a filter system having one or more filter beds that are periodically washed with a liquid, a gas and/or a combination of a liquid and a gas. The present invention can be used in both water and wastewater applications.

BACKGROUND OF THE INVENTION

Filter beds formed from one or more layers of filter media have been employed in a variety of known filters for filtering water or wastewater to remove impurities from liquids. For example, filter beds of granular media have been used in upflow filters, downflow filters as well as other type of filters including bi-flow filters. After the filter has been operating for a while, it is necessary to wash the filter bed to remove the impurities trapped in the filter beds during the filtration mode. Various methods have been used to wash the filter bed including but not limited to the steps of: (i) liquid only wash; (ii) air only wash; (iii) liquid and air concurrently; (iv) liquid only followed by air only; (v) air only followed by liquid only; and, (vi) liquid and air concurrently followed by liquid only.

It is important that the washing fluid is thoroughly distributed through the filter bed during the washing mode in order to remove the impurities trapped in the filter bed during operation of the filter in the filtration mode. Various underdrains and flumes have been used in an attempt to distribute the washing fluids uniformly throughout the filter beds. One significant problem encountered by prior art devices is their inability to accommodate changes in the washing procedure including changes in the flow rates and changes in the washing fluids. For example, a washing procedure that employs simultaneous liquid and air washing fluids is highly susceptible to mal-distribution of the washing fluid through the filter bed. Typically, in systems using this type of washing procedure, the filter bed is disposed above the underdrain. The underdrain often consists of a plurality of underdrain laterals placed in a side-by-side fashion. The underdrain laterals direct gas and liquid through the filter bed during the washing mode. The underdrain laterals are in fluid communication with a flume. The flume receives the washing fluids (i.e., gas and liquid) from their source and directs these fluids to the underdrain laterals. The gas/liquid interface in these flumes is often low, i.e., close to the bottom of the flume. This is undesirable as it limits the area available for the washing liquid resulting in relatively high liquid washing flow velocities down the length of the flume which in turn causes mal-distribution of the washing fluids to the underdrain and ultimately the filter bed.

One proposed solution to the low gas/liquid interface problem in the flume is to provide a flume with a bottom that is lower than the bottom of the filter bed. An example of this type of construction is shown in FIG. 3 of U.S. Pat. No. 6,312,611. Alternatively, separate members have been provided for conveying and distributing liquid and gas separately in an attempt to overcome the low gas/liquid interface problem. Examples of these types of devices are illustrated in FIGS. 4 through 7 of U.S. Pat. No. 6,312,611.

Another proposed solution to the low gas/liquid interface problem has been to provide at least one flume liquid metering orifice (i.e., a closed perimeter opening) in a particularly shaped baffle or stand-pipe. Examples of these structures are shown in FIGS. 10 through 20 of U.S. Pat. No. 6,312,611. The orifices, i.e., the closed perimeter openings, are preformed in baffle or the stand-pipe. FIG. 1 of the subject specification illustrates the orifice (i.e., a closed perimeter opening) design in a baffle wall. Specifically, an enclosed chamber/flume 2 includes a baffle wall 4 having an orifice 6. Air wall sleeve 8 and water wall sleeve 10 connect the flume 2 to the underdrain 12.

Forming orifices of the type illustrated in FIG. 1 of the subject specification normally requires expensive formwork to accommodate the air and water wall sleeves that are cast in place. To be cost effective, the wall sleeves are made using commercially available sizes, which limits the available orifice sizes. Hence, most designs are not optimal but rather less efficient designs due to the compromise between technical considerations and commercially available materials.

The orifice design disclosed and claimed in U.S. Pat. No. 6,312,611 is also inferior due to its inability to tailor the headloss characteristics over a range of flows. This is particularly troublesome when the washing procedure includes a first step of concurrent liquid and gas followed by liquid only. The velocity of the washing fluid in the first step is typically in the range of 5 to 10 gpm/sq.ft. However, the velocity of the washing fluid in the second step is in the range of 15 to 25 gpm/sq.ft.

The increase in the flow rate of the washing fluid in the second step dramatically impacts the headloss across the orifice. This is especially true where the design is such that the fluid can only pass through the orifice. U.S. Pat. No. 6,312,611 discloses several such designs including but not limited to FIGS. 15, 16, and 20. The impact of the increase in flow rate is seen by analyzing the well known flow vs. headloss relationship of $Q=cA\sqrt{2gh}$ where Q=flow, c=the orifice discharge coefficient, A=the cross-sectional area of the orifice, g=gravitational constant, and h=headloss across the orifice. Notably, the headloss across the orifice increases proportional to the square of the flow rate. If the backwash flow rate is increased from 5 gpm/sq.ft. to 25 gpm/sq.ft., the headloss across the orifice will increase by $$\left(\frac{25}{5}\right)^2$$

or 25 times the headloss across the orifice at a flow rate of 5 gpm/sq.ft. This dramatic increase in headloss creates very difficult flow control issues. It is very important that the change in flow from the concurrent gas/liquid rate to the liquid only rate be made very gradual and controlled. Poor flow control will likely result in disruption of the gas/liquid interface within the flume, mal-distribution of the washing fluids, and the undesirable release of uncontrolled air into the underdrain. These conditions will likely cause structural failures of the underdrain system, disruption of the support gravel, and poor performance. As is readily evident from the above discussion, the orifice design is inflexible from the design stand-point and the application stand point as the design is limited to commercially available sizes and is unable to accommodate changes in the washing procedure.

OBJECTS AND SUMMARY OF THE INVENTION

An object of the present invention is to provide a novel and unobvious flume and filter system therefore.

Another object of a preferred embodiment of the present invention is to provide a filter system having a flume that can readily accommodate different washing procedures including but not limited to: (i) liquid only wash; (ii) air only wash; (iii) liquid and air concurrently; (iv) liquid only followed by air only; (v) air only followed by liquid only; and, (vi) liquid and air concurrently followed by liquid only.

A further object of a preferred embodiment of the present invention is to provide a flume that eliminates or significantly reduces the costly and arduous procedures of preforming orifices in baffles or stand-pipes located in the flume.

Yet another object of a preferred embodiment of the present invention is to provide a flume that optimizes flow distribution in the flume while mitigating flow disturbances including but not limited to velocity head, jet effect and turbulence.

Still another object of a preferred embodiment of the present invention is to provide a flume that is easy to construct and that more accurately controls the height of the gas/liquid interface over a wider range of flow conditions.

Yet still another object of a preferred embodiment of the present invention is to provide a flume that induces laminar flow through the flume.

Still yet a further object of the present invention is to provide a flume that allows for a more controlled transition between low and high liquid flow rates.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume further includes at least a first inner wall and a second inner wall. Each of the first inner wall and the second inner wall are free of any orifices. The first inner wall is positioned relative to the second inner wall such that an open space is formed between the first inner wall and the second inner wall. The open space creates a first liquid/gas interface upstream of the first inner wall and the second inner wall and a second gas/liquid interface downstream of the first inner wall and the second inner wall when gas and liquid are present in the chamber. The first interface is spaced from the bottom wall of the chamber a distance greater than the second interface.

Another embodiment of the present invention is directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume further includes at least a first inner wall and an opening for creating a first liquid/gas interface upstream of the at least a first inner wall and a second gas/liquid interface downstream of the at least a first inner wall when gas and liquid are present in the chamber. The second liquid/gas interface is disposed below the first liquid/gas interface. The at least a first inner wall has a first section and a second section. The first section is disposed below the second section. The first section has a thickness greater than the second section.

A further embodiment of the present invention is directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume also includes at least a first inner wall and an opening for creating a first liquid/gas interface upstream of the at least a first inner wall and a second gas/liquid interface downstream of the at least a first inner wall when gas and liquid are present in the chamber. The second liquid/gas interface being disposed below said first liquid/gas interface. The flume further includes means for varying the size of the opening.

Still another embodiment of the present invention is directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume also includes at least a first inner wall and an opening for creating a first liquid/gas interface upstream of the at least a first inner wall and a second gas/liquid interface downstream of the at least a first inner wall when gas and liquid are present in the chamber. The second liquid/gas interface is disposed below the first liquid/gas interface. The opening has a width varying in size along the direction of fluid flow.

Yet still another embodiment of the present invention is directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume also includes at least a first inner wall, a second inner wall and an insert. The insert is operably connected to the first inner wall and the second inner wall. The insert is disposed relative to the first inner wall and the second inner wall such that a space is formed between the first inner wall and the second inner wall. The space creates a first liquid/gas interface upstream of the first inner wall and the second inner wall and a second gas/liquid interface downstream of the first inner wall and the second inner wall when gas and liquid are present in the chamber. The first interface is spaced from the bottom wall of the chamber a distance greater than the second interface. The insert has a top edge. The top edge of the insert is positioned above the second gas/liquid interface.

Still yet a further embodiment of the present invention is to directed to a flume for a filter system including at least one filter having a filter bed that is periodically washed with liquid, gas and/or a combination of liquid and gas. The flume includes a chamber having a top wall, a bottom wall, a left sidewall and a right sidewall. The chamber is adapted to receive a liquid, a gas and/or a combination of liquid and gas. The flume also includes at least a first inner wall and an opening for creating a first liquid/gas interface upstream of the at least a first inner wall and a second gas/liquid interface downstream of the at least a first inner wall when gas and liquid are present in the chamber. The second liquid/gas interface is disposed below the first liquid/gas interface. The flume further includes a flow control member operably associated with the opening for diverting the flow of liquid passing through the opening to reduce turbulence and disruption of the second liquid/gas interface. The flow control member is disposed downstream of the opening and between the top wall, the bottom wall, the left sidewall and the right sidewall.

DETAILED DESCRIPTION OF THE PREFERRED EMBODIMENTS OF THE INVENTION

The preferred forms of the invention will now be described with reference to FIGS. 2-18. The appended claims are not limited to the preferred forms and no term and/or phrase used herein is to be given a meaning other than its ordinary meaning unless it is expressly stated otherwise. The term "orifice" as used herein and in the relevant industry means "an opening having a closed perimeter through which a fluid may discharge."

FIGS. 2 Through 18

Figure 1:
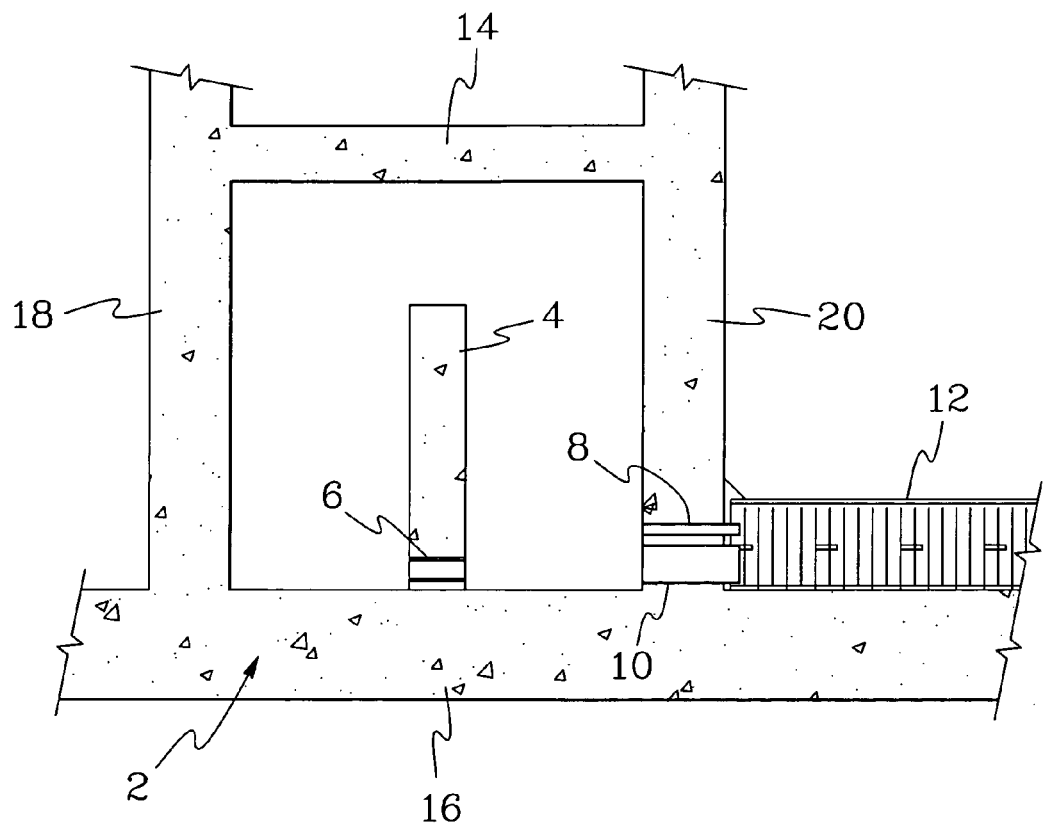
FIG. 1 is a fragmentary cross-sectional view of a prior art filter system depicting a flume connected to an underdrain.
Figure 2:
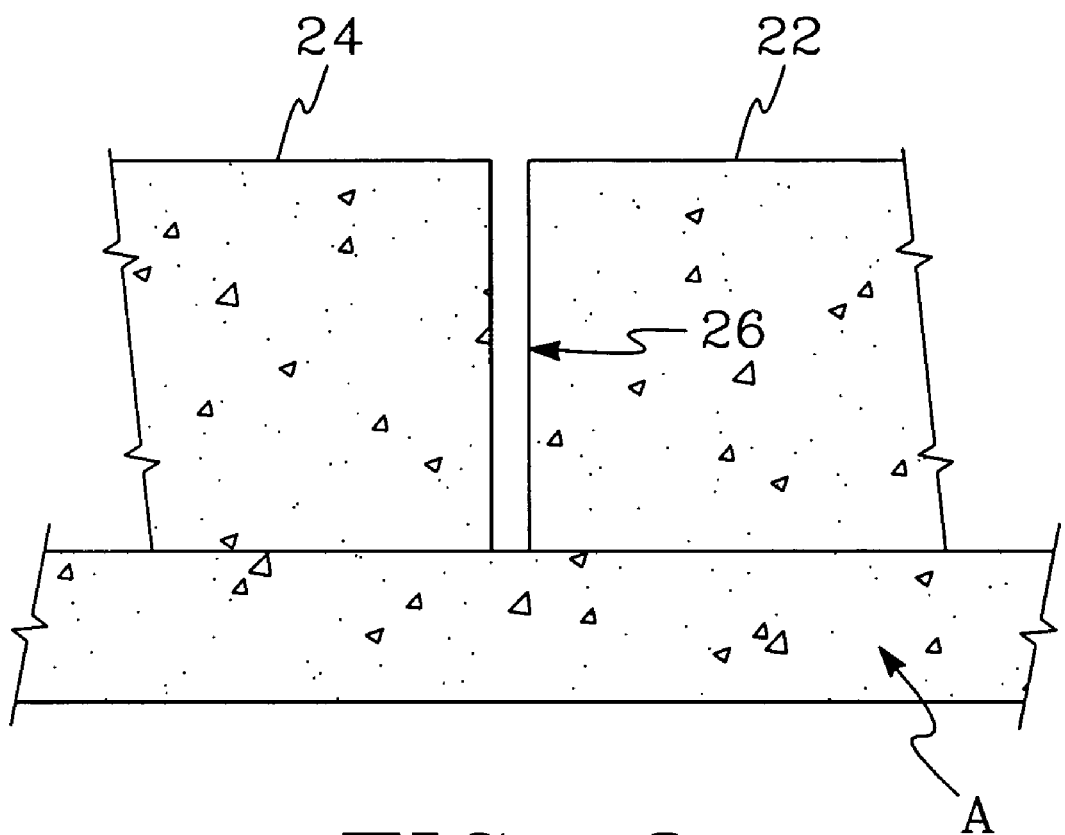
FIG. 2 is a fragmentary cross-sectional view of a flume formed in accordance with a first preferred embodiment of the present invention.

Referring to FIG. 2, a fragmentary portion of a flume A formed in accordance with a preferred embodiment of the present invention is illustrated. Preferably, flume A is similar in exterior construction to flume 2 depicted in FIG. 1, i.e., the flume A preferably has an exterior performed by a top wall 14, a bottom wall 16, a left sidewall 18 and a right sidewall 20 as depicted in FIG. 1. Preferably, the bottom wall is at approximately the same elevation as the bottom of the filter housing as shown in FIG. 1. This arrangement is often referred to as flat bottom flume. However, it should be understood that the present invention may be used with other types of flumes including but not limited to flumes having a bottom lower than the bottom of the corresponding filter housing often referred to as recessed bottom flumes. Wall sleeves similar to sleeves 8 and 10 illustrated in FIG. 1 may be used to connect the flume A to one or more filters. However, other means may be used for connecting flume A to the corresponding filter or filters. Further, the corresponding filter or filters may have an underdrain similar to underdrain 12 illustrated in FIG. 1. However, other types of underdrains may be used in the filters.

Figure 3:
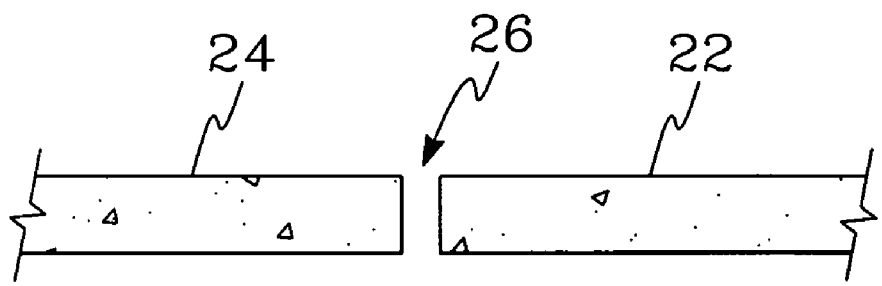
FIG. 3 is a fragmentary plan view of the embodiment illustrated in FIG. 2.

Referring to FIGS. 2 and 3, flume A includes a first discrete inner wall 22 and a second discrete inner wall 24. As seen in FIGS. 2 and 3, inners walls 22 and 24 are parallel to each other and share a common horizontal axis. Preferably, the inner walls 22 and 24 are spaced from the top wall, the left sidewall and the right sidewall of the flume similar to the spacing illustrated for baffle 4 and walls 14, 18 and 20 in FIG. 1. However, the spacing may be varied as desired.

The inner walls 22 and 24 are free of any orifices, i.e., the walls do not include any type of closed perimeter opening through which a fluid can discharge. Rather, the adjacent ends of the inner walls 22 and 24 are offset creating an open perimeter space 26 between the walls through which liquid may flow. In this embodiment, space 26 runs along the entire height of the walls 22 and 24. Further, the space 26 has a uniform width.

Space 26 is sized to pass the desired amount of flow while inducing a desired degree of headloss that will drive the gas/liquid interface upstream of the walls 22 and 24 upwardly to a position above the gas/liquid interface downstream of the walls 22 and 24. This increases the area in the flume for the liquid thereby reducing the flow velocities of the liquid through the flume. Accordingly, mal-distribution present in flat bottom type flumes is eliminated or at the very least significantly reduced.

By spacing adjacent walls a given distance from each other as opposed to forming orifices in baffles or other structures, this embodiment has virtually unlimited flexibility. Specifically, the spacing can be varied right up to the time of construction at the site to accommodate last minute design changes in the filtration system without re-fabrication or replacement of the flume or components thereof. It will be readily appreciated that the number of spaces 26 in flume A may be varied as desired merely by adding additional internal walls and spacing each wall a given distance from an adjacent wall. Further, the width of one space 26 may be made different from one or more additional spaces 26 merely by adjusting the spacing of the corresponding walls.

Figure 6:
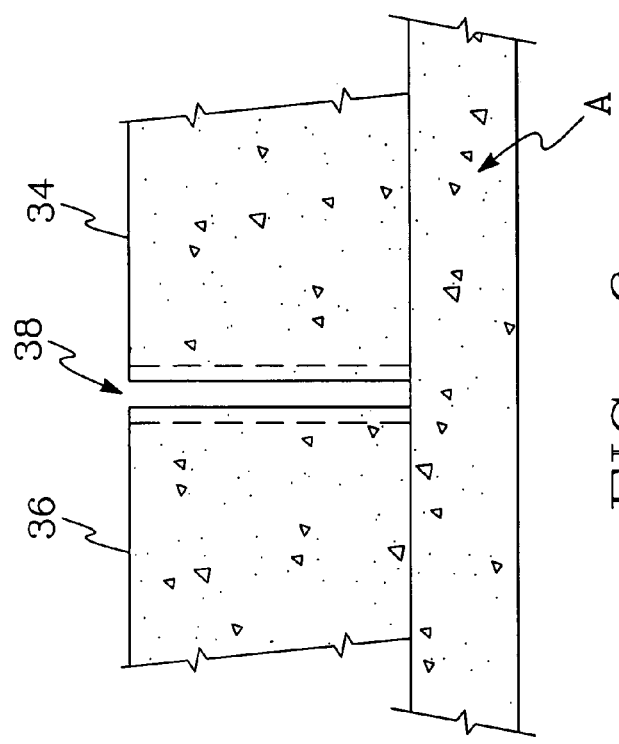
FIG. 6 is a fragmentary cross-sectional view of a flume formed in accordance with a third preferred embodiment of the present invention.
Figure 7:
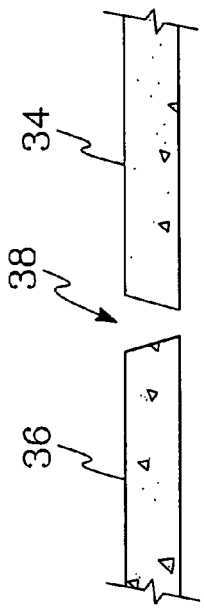
FIG. 7 is a fragmentary plan view of the embodiment illustrated in FIG. 6.
Figure 4:
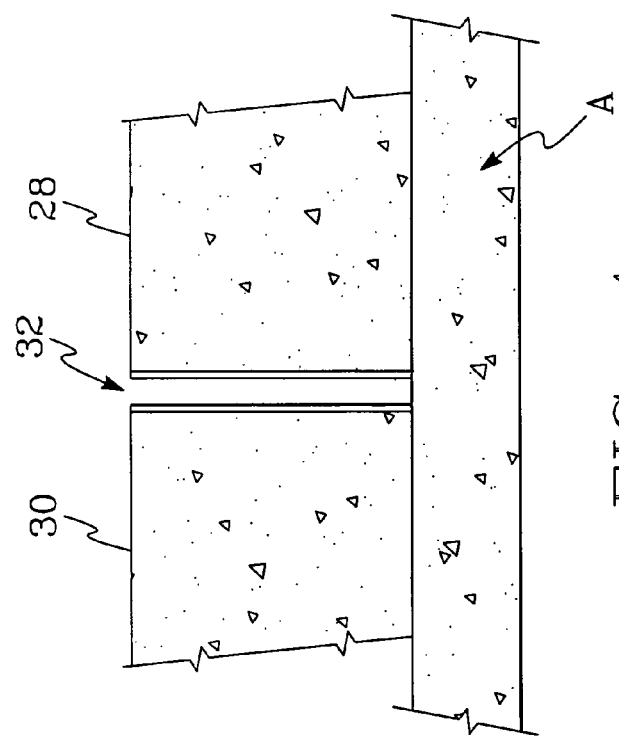
FIG. 4 is a fragmentary cross-sectional view of a flume formed in accordance with a second preferred embodiment of the present invention.
Figure 5:
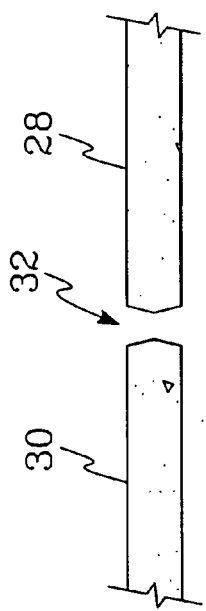
FIG. 5 is a fragmentary plan view of the embodiment illustrated in FIG. 4.

FIGS. 4 through 7 illustrate two of many possible alternatives to the uniform width of space 26 illustrated in FIGS. 2 and 3. Specifically, referring to FIGS. 4 and 5, flume A includes a first discrete inner wall 28 and a second discrete inner wall 30. The adjacent ends of the inner walls 28 and 30 are offset creating an open perimeter space 32 between the walls through which liquid may flow. The width of space 32 varies over the direction of fluid flow. Specifically, the space 32 initially tapers inwardly toward the mid-section and then subsequently tapers outwardly. Referring to FIGS. 6 and 7, flume A includes a first discrete inner wall 34 and a second discrete inner wall 36. The adjacent ends of the inner walls 34 and 36 are offset creating an open perimeter space 38 between the walls through which liquid may flow. The width of space 38 varies over the direction of fluid flow. Specifically, the space 38 tapers outwardly from the upstream side of inner walls 34 and 36 to the downstream side. By modifying the geometry of the space it is possible to readily change the discharge coefficient of the space to accommodate varying conditions encountered by a given filtration system. It will be readily appreciated that the flume can include all three types of spaces (i.e., spaces 26, 32 and 38) at the same time.

Figure 8:
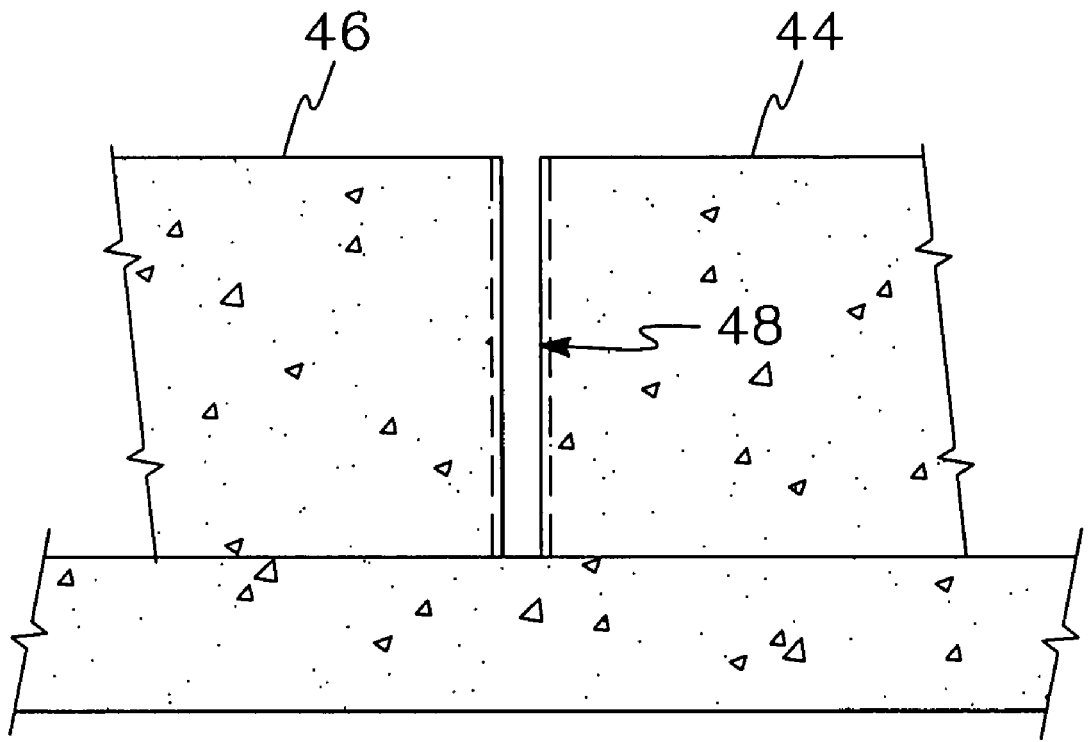
FIG. 8 is a fragmentary cross-sectional view of a flume formed in accordance with a fourth preferred embodiment of the present invention.
Figure 9:
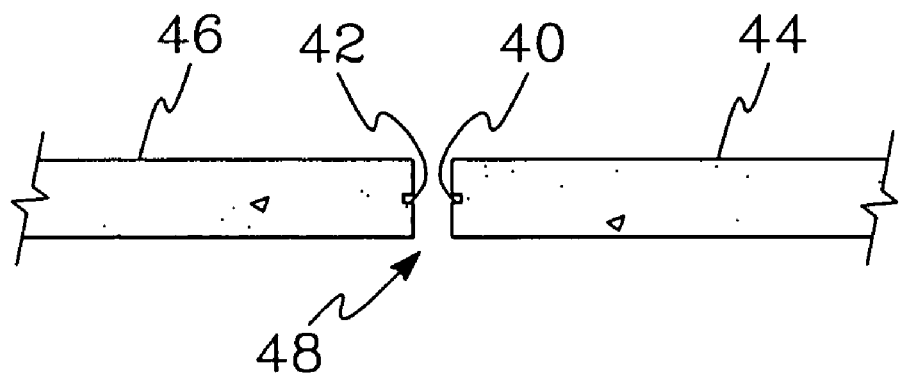
FIG. 9 is a fragmentary plan view of the embodiment illustrated in FIG. 8.
Figure 10:
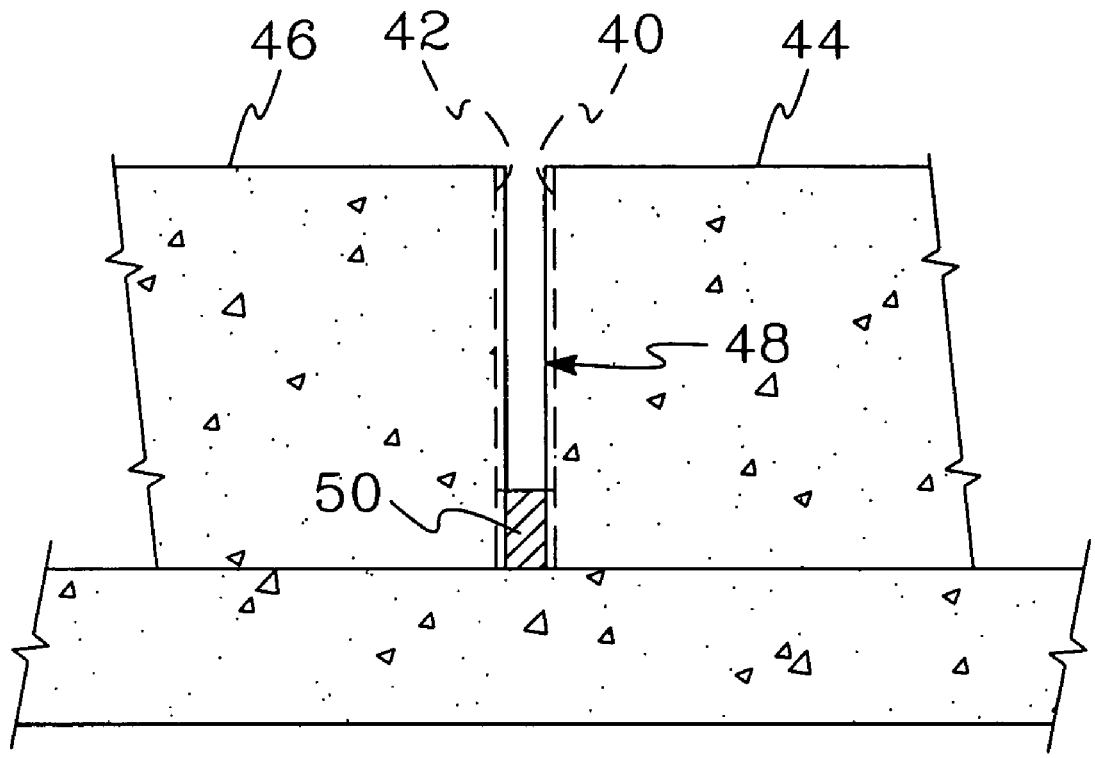
FIG. 10 is a fragmentary cross-sectional view of a flume formed in accordance with a fifth preferred embodiment of the present invention.
Figure 11:
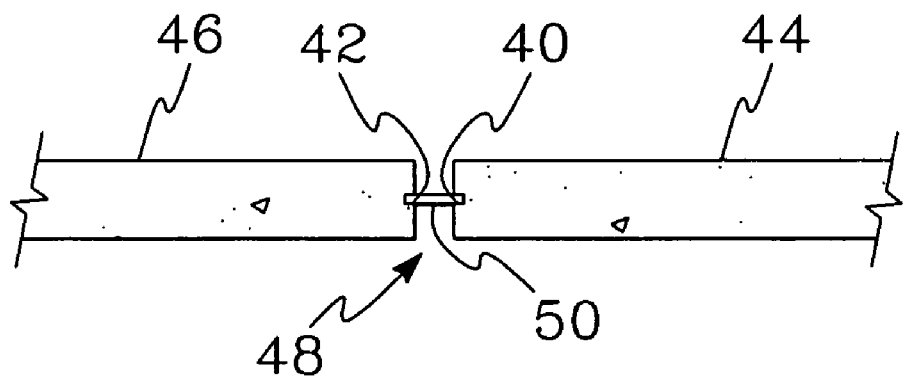
FIG. 11 is a fragmentary plan view of the embodiment illustrated in FIG. 10.
Figure 12:
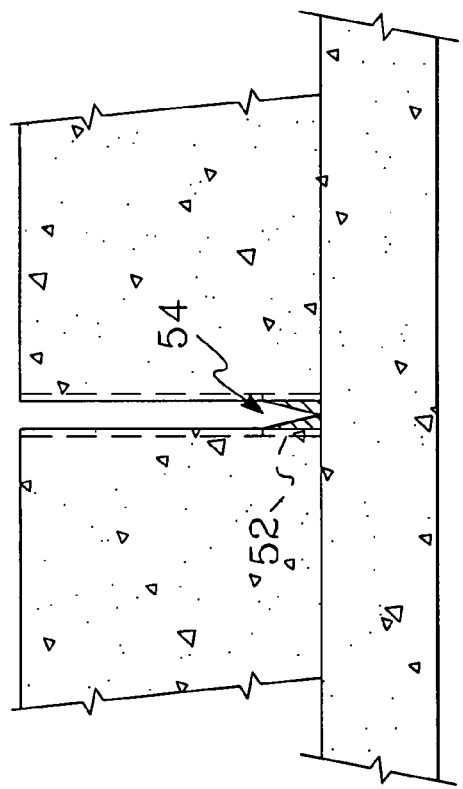
FIG. 12 is a fragmentary cross-sectional view of a flume formed in accordance with a sixth preferred embodiment of the present invention.
Figure 13:
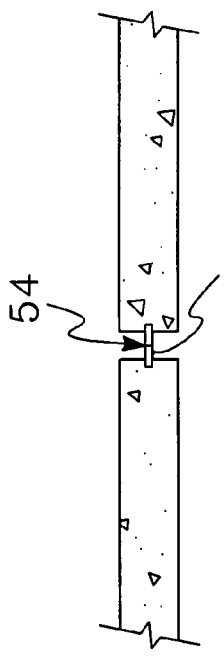
FIG. 13 is a fragmentary plan view of the embodiment illustrated in FIG. 12.
Figure 14:
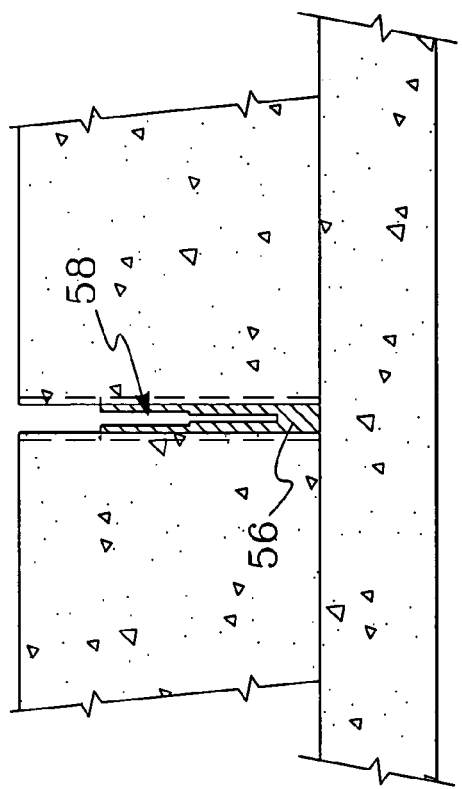
FIG. 14 is a fragmentary cross-sectional view of a flume formed in accordance with a seventh preferred embodiment of the present invention.
Figure 15:
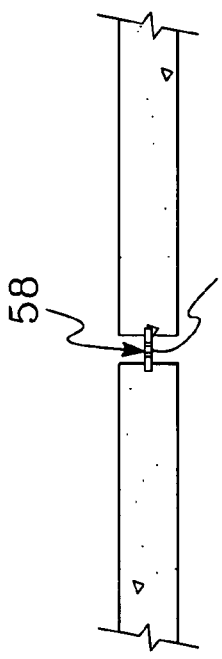
FIG. 15 is a fragmentary plan view of the embodiment illustrated in FIG. 14.

Referring to FIGS. 8 and 9, a further alternative embodiment is illustrated. This embodiment is the same as the embodiment disclosed in FIGS. 2 and 3 with the exception that slots 40 and 42 are formed in the adjacent inner walls 44 and 46, respectively. The slots allow for the receipt of a means for varying the size of the open space in the form of a plate like insert member to vary the size of space 48 formed between the inner walls 44 and 46. Accordingly, the flume A may initially be installed with internal walls as depicted in FIGS. 8 and 9, and at so later time the size of the space 48 may be varied to accommodate a change in flow conditions by inserting the plate like member. It will be readily appreciated that other means may be used for varying the size of the space 48. FIGS. 10 and 11 depict one of many possible structures/means that may be used to varying the size of the space 48. Specifically, an insert plate 50 is slid into the slots 40 and 42 to reduce the size of the space 48. FIGS. 12 and 13 illustrate an insert plate 52 with a V-shaped notch 54. FIGS. 14 and 15 illustrate an insert plate 56 with a stepped notch 58. It should be noted that the ends of inner walls 22 and 24 can be shaped to form a V-shaped space or a stepped shaped space similar to those configurations formed by insert plates 52 and insert plate 56. The varied configurations of the notches like the varying widths of space formed between the inner walls provide desired headloss characteristics over a range of flows. Further, these configurations create a more linear flow versus headloss relationship that permits a more controlled transition between low and high flow rates.

Figure 16:
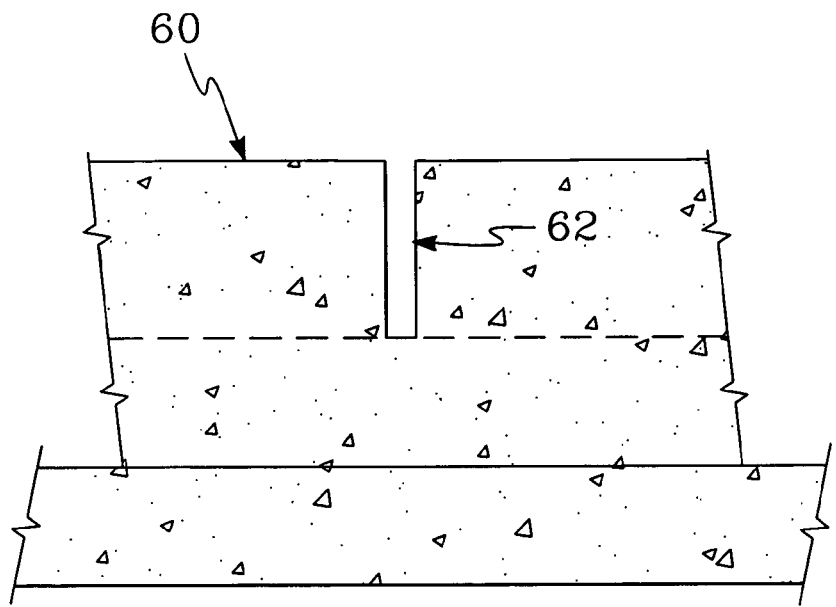
FIG. 16 is a fragmentary cross-sectional view of a flume formed in accordance with an eighth preferred embodiment of the present invention.
Figure 17:
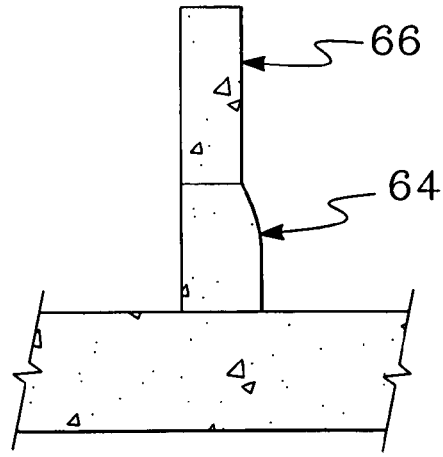
FIG. 17 is a fragmentary cross-sectional view illustrating the profile of the internal wall illustrated in FIG. 16.

Referring to FIGS. 16 and 17, a further alternative embodiment is depicted. An inner wall 60 is oriented in the interior of the flume A in a similar position to the previously described embodiments. The inner wall 60 like the other embodiments preferably is free of any orifices. Rather, an open perimeter space 62 is formed to allow liquid to flow downstream. The inner wall includes a first lower section 64 and a second upper section 66. The downstream side of the lower section 64 has an arcuate profile. The arcuate profile extends outwardly downstream of the space 62. This arcuate profile induces laminar flow via the Coanda effect thereby reducing the disruption of the downstream gas/liquid interface. The arcuate profile may be formed on any of the previously referred to inner walls and/or the insert member.

Figure 18:
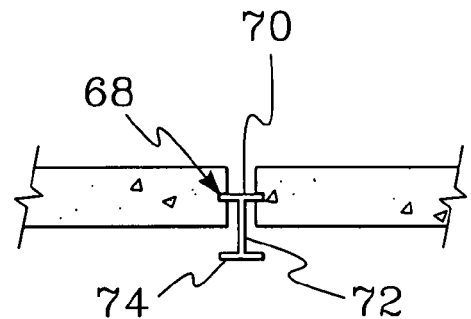
FIG. 18 fragmentary plan view of a further alternative insert member.

Referring to FIG. 18, a further alternative form of insert member is illustrated. This embodiment is similar to the embodiment illustrated in FIGS. 10 and 11 and, therefore, only the differences will be described in detail. Insert member 68 includes a first plate 70 that preferably has the same configuration and dimensions as member 50 illustrated in FIGS. 10 and 11. The insert member further includes a connecting rib 72 and a flow distribution plate 74. Flow distribution plate 74 is located downstream of plate 70 to divert the flow of liquid over member 68 to reduce turbulence and minimize the disruption of the gas/liquid interface on the downstream side of the inner walls. Plate 70, rib 72 and the flow distribution plate 74 can be formed as one-piece from any suitable material including but not limited to PVC. Alternatively, these elements maybe formed as separate pieces and secured in any conventional manner. The rib 72 may be omitted and replaced with other means for securing the plate 70 to the flow distribution plate 74. Preferably, plate 74 has the same dimensions and configuration as member 70 and extends parallel thereto. However, plate 74 may be larger or smaller than member 50 and may be oriented at an angle to member 50 that is less than 90° degrees and greater than 0°.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A flume for a filter system including at least one filter having a filter bed that is periodically washed with liquid, gas and/or a combination of liquid and gas; said flume comprising:
   (a) an enclosed chamber having a top wall, a bottom wall, a left sidewall and a right sidewall, said chamber being adapted to receive a washing liquid, a washing gas and/or a combination of washing liquid and washing gas, said chamber having a gas exit opening through which the washing gas exits said chamber en route to the filter bed; and,
   (b) at least a first inner wall and a second inner wall disposed in said enclosed chamber, each of said first inner wall and said second inner wall being free of any orifices, said first inner wall being positioned relative to said second inner wall such that an open space is formed between said first inner wall and said second inner wall, said open space creates a first washing liquid/washing gas interface upstream of said first inner wall and said second inner wall and a second washing liquid/washing gas interface downstream of said first inner wall and said second inner wall when washing gas and washing liquid are present in said chamber; said first interface being spaced from said bottom wall of said chamber a distance greater than said second interface, said second washing liquid/washing gas interface being disposed below said gas exit opening.

2. A flume as set forth in claim 1, wherein: (a) said first inner wall having a first height, said open space extends upwardly a distance equal to or greater than half of said first height of said first inner wall.

3. A flume as set forth in claim 1, wherein:
   (a) said first inner wall and said second inner wall are configured such that said open space has a width that varies in size relative to the direction of fluid flow.

4. A flume as set forth in claim 3, wherein: (a) said open space has an upstream width, a downstream width and an intermediate width taken between said upstream width and said downstream width.

5. A flume as set forth in claim 4, wherein: (a) said upstream width is less than said downstream width.

6. A flume as set forth in claim 4, wherein: (a) said upstream width is greater than said intermediate width.

7. A flume for a filter system including at least one filter having a filter bed that is periodically washed with liquid, gas and/or a combination of liquid and gas; said flume comprising:
(a) an enclosed chamber having a top wall, a bottom wall, a left sidewall and a right sidewall, said chamber being adapted to receive a washing liquid, a washing gas and/or a combination of washing liquid and washing gas, said chamber having a gas exit opening through which the washing gas exits said chamber en route to the filter bed; and,
(b) at least a first inner wall and a second inner wall disposed in said enclosed chamber, said first inner wall being positioned relative to said second inner wall such that an open space is formed between said first inner wall and said second inner wall, said open space creates a first washing liquid/washing gas interface upstream of said first inner wall and said second inner wall and a second washing liquid/washing gas interface downstream of said first inner wall and said second inner wall when washing gas and washing liquid are present in said chamber, said second washing liquid/washing gas interface being disposed below said first washing liquid/washing gas interface, said second washing liquid/washing gas interface being disposed below said gas exit opening; and,
(c) means for varying the size of said open space.

8. A flume as set forth in claim 7, wherein: (a) said means for varying the size of said open space includes a plate, said plate being operably connected to said first inner wall and said second inner wall.

9. A flume as set forth in claim 8, wherein: (a) said plate is free of any orifices.

10. A flume as set forth in claim 8, wherein: (a) said plate extends between said first inner wall and said second inner wall.

11. A flume as set forth in claim 10, wherein: (a) said first inner wall and said second inner wall each have a slot for receiving said plate.

12. A flume as set forth in claim 11, wherein: (a) said plate has a v-shaped notch formed therein.

13. A flume as set forth in claim 11, wherein: (a) said plate has a stepped notch formed therein.

14. A flume for a filter system including at least one filter having a filter bed that is periodically washed with liquid, gas and/or a combination of liquid and gas; said flume comprising:
(a) an enclosed chamber having a top wall, a bottom wall, a left sidewall and a right sidewall, said chamber being adapted to receive a washing liquid, a washing gas and/or a combination of washing liquid and washing gas, said chamber having a gas exit opening through which the washing gas exits said chamber en route to the filter bed; and,
(b) at least a first inner wall, a second inner wall and an insert disposed in said enclosed chamber, said insert being operably connected to said first inner wall and said second inner wall, said insert being disposed relative to said first inner wall and said second inner wall such that a space is formed between said first inner wall and said second inner wall, said space creates a first washing liquid/washing gas interface upstream of said first inner wall and said second inner wall and a second washing liquid/washing gas interface downstream of said first inner wall and said second inner wall when washing gas and washing liquid are present in said chamber; said first washing liquid/washing gas interface being spaced from said bottom wall of said chamber a distance greater than said second washing liquid/washing gas interface, said second washing liquid/washing gas interface being disposed below said gas exit opening; and,
(d) said insert having a top edge, said top edge of said insert being positioned above said second gas/liquid interface.

15. A flume as recited in claim 14, wherein: (a) said insert is slidably connected to said first inner wall and said second inner wall.

16. A flume for a filter system including at least one filter having a filter bed that is periodically washed with liquid, gas and/or a combination of liquid and gas; said flume comprising:
(a) an enclosed chamber having a top wall, a bottom wall, a left sidewall and a right sidewall, said chamber being adapted to receive a washing liquid, a washing gas and/or a combination of washing liquid and washing gas, said chamber having a gas exit opening through which the washing gas exits said chamber en route to the filter bed; and,
(b) at least a first inner wall and a second inner wall disposed in said enclosed chamber, said first inner wall being positioned relative to said second inner wall such that an open space is formed between said first inner wall and said second inner wall, said open space creates a first washing liquid/washing gas interface upstream of said a first inner wall and said second inner wall and a second washing liquid/washing gas interface downstream of said first inner wall and said second inner wall when washing gas and washing liquid are present in said chamber, said second washing liquid/washing gas interface being disposed below said first washing liquid/washing gas interface, said second washing liquid/washing gas interface being disposed below said gas exit opening, said at least first inner wall being free of any orifices.

* * * * *